FIG. 3

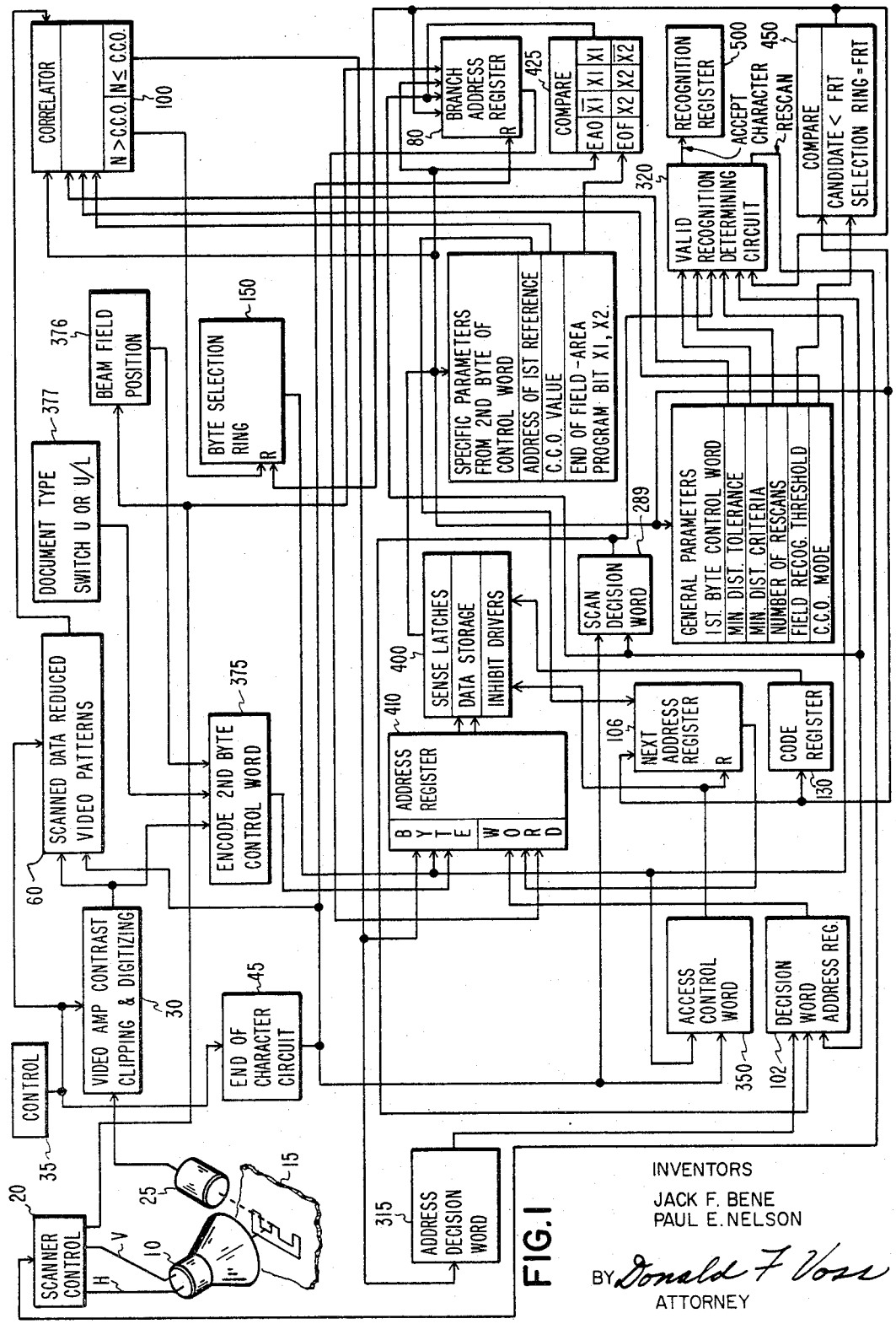
FIG. I
INVENTORS
JACK F. BENE
PAUL E. NELSON
BY Donald F. Voss
ATTORNEY

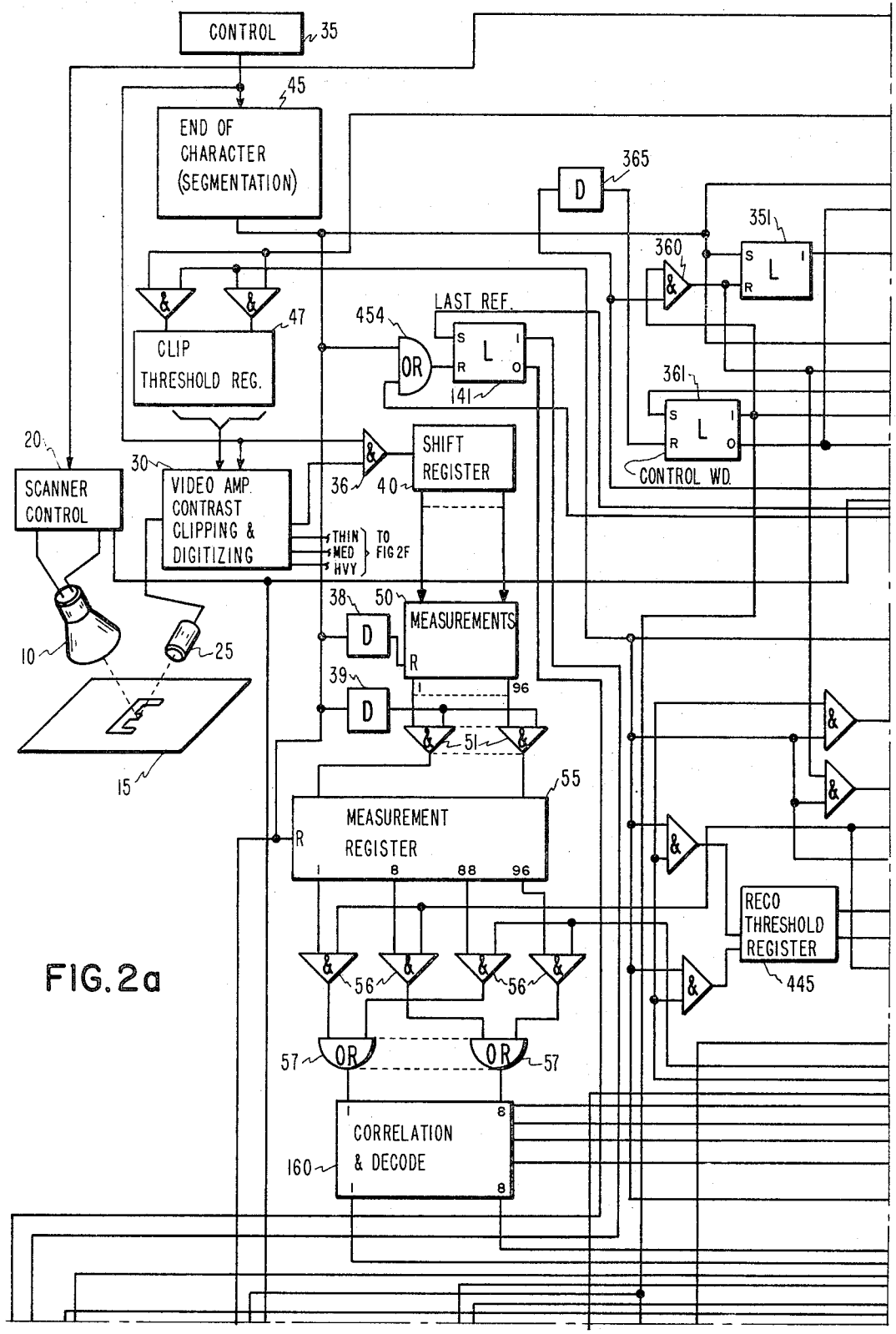

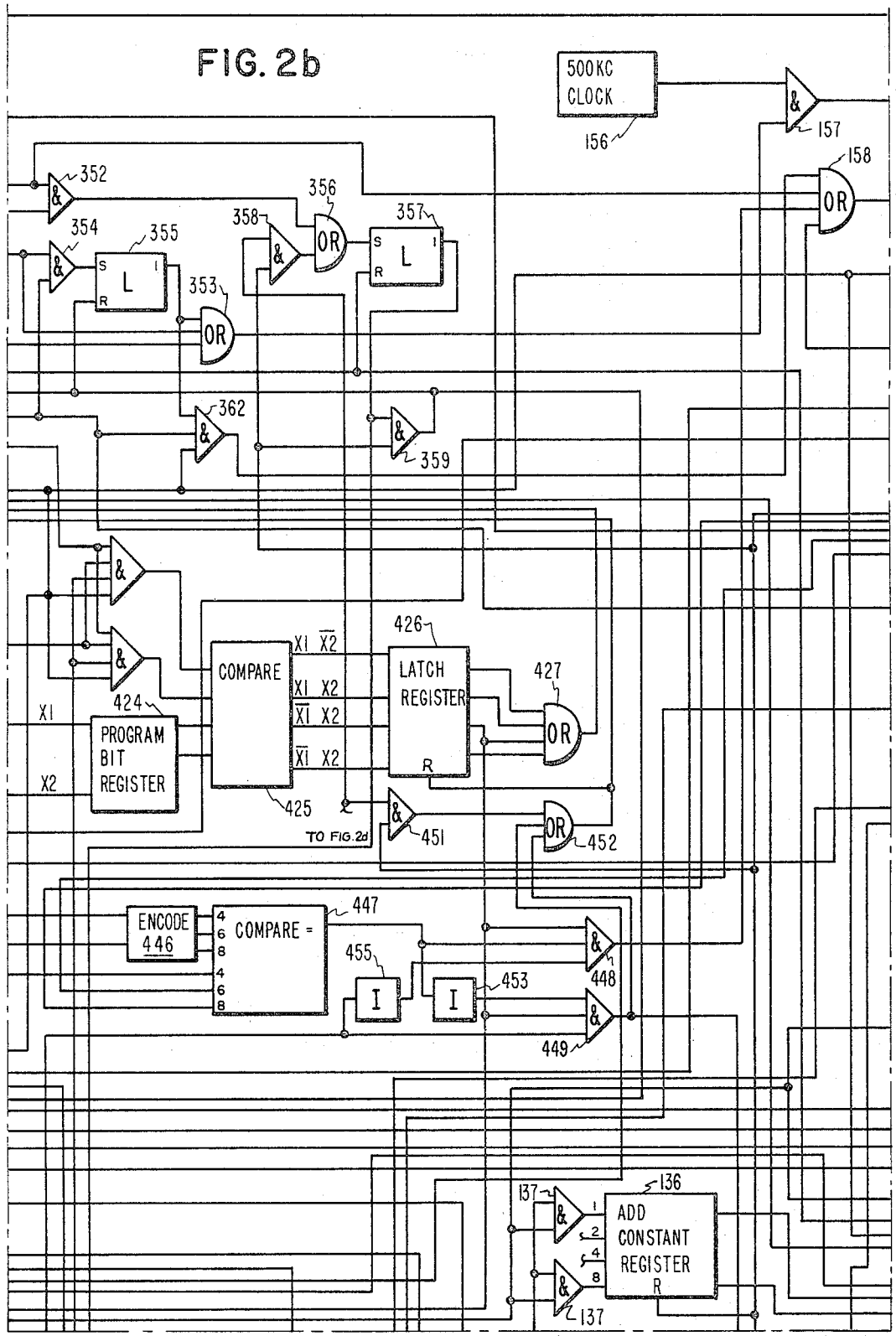

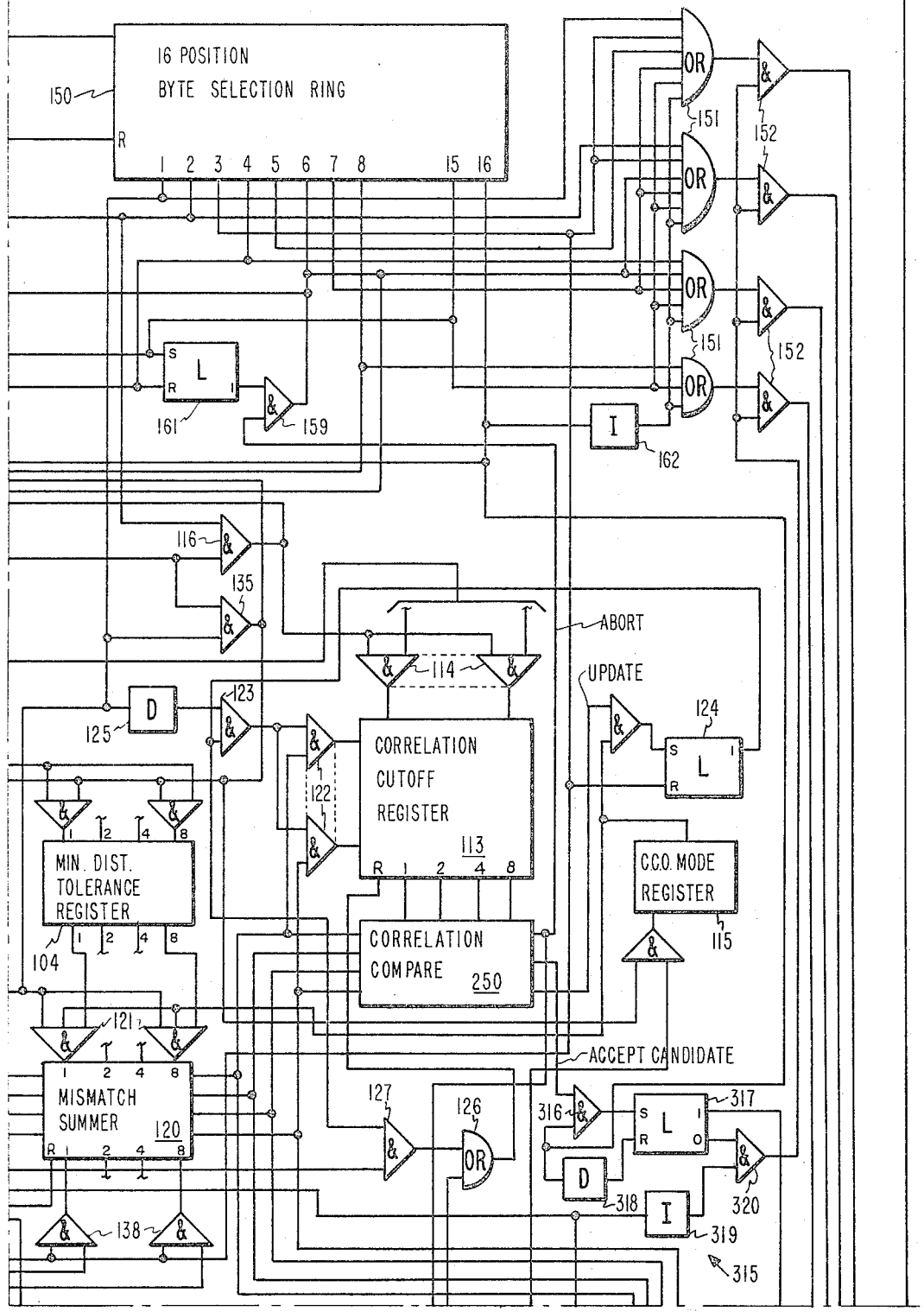

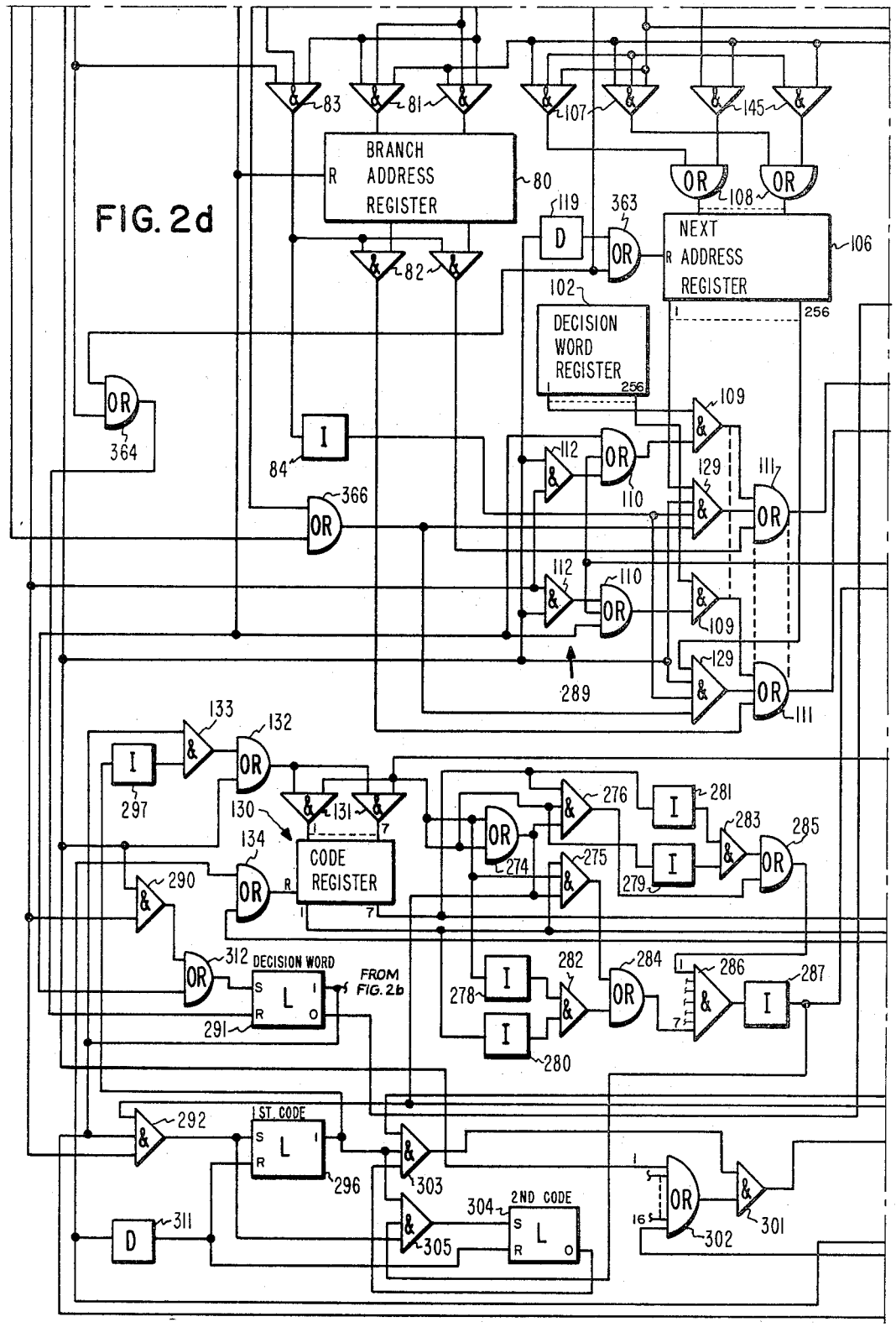

| 2a | 2b | 2c |
|----|----|----|
| 2d | 2e | 2f |

FIG. 4 — CONTROL WORD

| | | | | | | | COUNT BYTE |
|---|---|---|---|---|---|---|---|
| P | | MIN. DIST. TOLERANCE | CLIP THRESH | RESCAN | MIN. DIST. CRITERIA | C.C.O. MODE | FLD RECO THRESH | 1 |
| P | NUMERIC C.C.O. | $X_1$ | $X_2$ | NUM. START ADDRESS | | | 2 |
| P | ALPHA U.C. C.C.O. | $X_1$ | $X_2$ | ALPHA. START ADDRESS U.C. | | | 3 |
| P | OTHER SECOND BYTES | | | | | | 4 |
| P | | | | | | | 14 |
| P | | | | | | | 15 |
| P | | | | | | | 16 |

BIT NO. 0 1 2 3 4 5 6 7 8 9 10 11 12 13 14 15 16 17

FIG. 5 — REFERENCE WORD

| | | | | COUNT BYTE |
|---|---|---|---|---|
| P | CODE | | ADD CONST. | 1 |
| P | *$X_1$ **$X_2$ | NEXT ADDRESS | | 2 |
| P | BRANCH ADDRESS | | | 3 |
| P | IDEALS | DEFINING | | 4 |
| P | | | | 15 |
| P | | | | 16 |

BIT NO. 0 1 2 3 4 5 6 7 8 9 10 11 12 13 14 15 16 17

\* $X_1$ – LAST REFERENCE AREA
\*\* $X_2$ – LAST REFERENCE FIELD

| | | DECISION WORD | | COUNT BYTE |
|---|---|---|---|---|
| P | ✱ | CODE | REF WORD ADDRESS | 1 |
| P | | | | 2 |
| P | | | | 3 |
| P | | | | 4 |
| P | | | | 5 |
| P | | | | 6 |
| P | | | | 7 |
| P | | | | 8 |
| P | | | | 9 |
| P | | | | 10 |
| P | | | | 11 |
| P | | | | 12 |
| P | | | | 13 |
| P | | | | 14 |
| P | | | | 15 |
| P | | | | 16 |

BIT NO. | 0 | 1 | 2 | 3 | 4 | 5 | 6 | 7 | 8 | 9 | 10 | 11 | 12 | 13 | 14 | 15 | 16 | 17 |

✱-CONFLICT
P-PARITY BIT

FIG. 6

United States Patent Office 3,384,875
Patented May 21, 1968

3,384,875
REFERENCE SELECTION APPARATUS FOR
CROSS CORRELATION
Jack F. Bene and Paul E. Nelson, Rochester, Minn., assignors to International Business Machines Corporation, Armonk, N.Y., a corporation of New York
Filed Sept. 27, 1965, Ser. No. 490,244
9 Claims. (Cl. 340—172.5)

ABSTRACT OF THE DISCLOSURE

A control word includes a first byte of data for generally controlling the cross correlation process. The remaining bytes of the control word are selectable through an encoding means which develops a second byte address according to indications of types of unknown data sets. The selected second byte of the control word contains the address for the first reference word to be used in the cross correlation process. Each reference word contains an address of another reference word. Means are provided to generate a last reference signal in response to control bits in the control word being matched by control bits within a reference. A decision word is scanned in response to the last reference signal. If a valid identification is made, then the cross correlation process terminates. However, if the unknown data set has not been identified, the cross correlation process continues with a reference identified either by the next address taken from the last reference or an address taken from a branch address register.

---

This invention is related to apparatus for selecting references to be used for cross correlation with an unknown data set and more particularly to apparatus which utilizes certain data associated or related to the unknown data set for initially choosing a set of references for cross correlation with the unknown data set and which selects another set of references if a decision cannot be made after correlating the unknown data with the first set of references.

The sets of references are divided into major groups designated areas and each area is divided into sub-groups called fields. The fields of references within an area most likely to result in a decision with regard to the unknown data set are first cross correlated with the unknown data set. The references themselves contain information indicating an end-of-field or end-of-area condition. Control information designates whether or not all fields within an area should be cross correlated before ascertaining if a valid identification has been made. The control information can signify that after the last reference within a field has been cross correlated, the candidate reference codes for identifying the unknown data set should be logically examined to determine if a valid identification has been made. If a valid identification has been made, cross correlation of the unknown data set with references terminates. On the other hand, if the valid identification has not been made, cross correlation continues with a new field of references. Upon completion of cross correlation of the unknown data set with the new field of references, a determination is again made as to whether or not there is a valid identification of the unknown data set. With this type of control information, cross correlation continues until a valid identification of the unknown data set has been made or until a reference has been cross correlated which contains an end-of-area indication. It is seen that this type of control permits dividing references into sub-groups where the sub-groups of references are generally similar or of the same class but vary in their restrictiveness with regard to the unknown data set.

Other control conditions are available for determining when the cross correlation process should terminate. Control information can signify that whenever a reference is encountered, indicating an end-of-field condition, the cross correlation process for the particular unknown data set terminates unconditionally. Still in other instances, the control information signifies that cross correlation of the references with the unknown data set continues until an end-of-area condition is identified. Detection of an end-of-field condition in a reference, will not, in this instance, terminate the cross correlation operation.

The control information in addition to the specific types of control conditions, just mentioned, also includes general information for controlling the cross correlation process which applies under all conditions. However, different general information can be called into play for control as well as different specific types of control information.

For the purpose of illustrating the invention, as will be seen later herein, the reference consisting of digital data are stored in an addressable data storage in the form of reference words. These reference words are structured to contain a predetermined number of bytes with a predetermined number of bits in each byte. The first byte of each reference word contains data bits identifying the reference according to a particular data processing machine code. There are also other data bits within the first byte which are used in the cross correlation process. The second byte of each reference word contains the address of the location of the next reference word to be used in the cross correlation process. The second byte also contains two bit positions for storing bits to designate end-of-area and field conditions. The third byte of each reference word has the facility for storing bits for a branch address. The branch address enables branching out of a sequence of fields into a new sequence of fields within the same or different reference area. The remaining bytes within each reference word contain data bits which are cross correlated with the bits of the unknown data set.

The first reference word to be used in the cross correlation process is accessed by means of a control word. The control word is organized somewhat similar to the reference words in that it consists of a plurality of bytes with a predetermined number of bits within each byte. The first byte of a control word contains data bits representing general parameters to control the cross correlation process. For example, it has provisions for containing data bits representing the mode of cross correlation, i.e., whether or not correlation with a reference will be cut off, if, during correlation, the number of resulting mismatches between a reference and the unknown data set exceeds a fixed predetermined value or a value being updated continuously while converging to the best reference candidate for identification. It also contains minimum distance criteria data bits for representing the required separation between first and second best identifying references in order for the first best identifying reference to qualify as identifying the unknown data set. Additionally, a minimum distance tolerance value is contained within the first byte. After a first qualifying reference is obtained, i.e., one where the number of mismatches resulting from correlation is less than a given threshold, this minimum distance tolerance value is then added to the threshold. This is done for the purpose of developing a limited band of references qualifying to identify the unknown data set, to facilitate the minimum distance check and to limit the number of classes of references to be considered if further cross correlation is required to identify the unknown data set.

By limiting the number of classes of references used during subsequent cross correlation with the same unknown data set more discriminatory references within a class can be used and thereby increase the possibility of the unknown data set being identified before it is rejected. The first byte of the control word contains data designating the number of allowable re-scans before rejecting the unknown character and contains data for selecting the clipping threshold to be used during re-scanning. The first byte also contains data for setting forth the limits within which the identity of a qualifying reference word must be found in the decision word in order for it to be considered as a valid identifying reference. This data is designated the field recognition threshold. The field recognition threshold thus requires that a qualifying reference be within a certain minimum degree of correlation within the unknown data set.

The remaining bytes within the control word are all second bytes. In other words, the second byte of the control word can be selected from any of the remaining bytes therewithin. Each of these remaining bytes contains different data of the same category. For example, each second byte contains program bits for controlling-end-of-field and area determinations. These program bits are used to set up four different control conditions. When any of these control conditions are matched by the end-of-field and area bits within a reference word, a signal is generated indicating that the last reference within a field or area has been correlated and the decision word should be scanned. In addition to these important program bits, each second byte of the control word contains the address of the first reference to be cross correlated. Each second byte also contains data representing a correlation cutoff value to be used when operating in the fixed correlation cutoff mode, or representing the initial value when operating in the converging correlation cutoff mode.

The decision word consists of a predetermined number of bytes for storing the identities of the reference words qualifying to identify the unknown data set. These identities are ordered within the decision word according to the number of mismatches occurring between the corresponding references and the unknown data set. The decision word is scanned from the low order to the high order byte position. The first encountered order position containing an identity of a reference set is considered the identity of the unknown set of data provided the byte position is within the field recognition threshold and the next occupied position in the decision word is outside the minimum distance criteria.

Hence, in order to begin a cross correlation operation, a control word is first accessed. A first byte of this control word provides general parameters to be used for the cross correlation process. The second byte of the control word, which can be any of the remaining bytes therewithin, locates the first reference to be used in the cross correlation process. It also contains program bits which are stored in a register for setting up control conditions for determining when an end-of-a-reference field or area has been encountered. The first reference used in the cross correlation process contains the address of the next reference to be used. The cross correlation process continues in a manner as determined by the program bits, for setting up the end-of-field and area conditions.

The primary advantages of the invention are increased speed in arriving at a valid identification of the unknown data set and greater flexibility in cross correlating unknown data sets which are of the same general class but vary in degree. While the invention is broadly useful for any type of table look-up operation, it is very suitable for character or pattern recognition where the unknown character or pattern is resolved into an unknown set of data which is cross correlated with reference sets of data representing known characters. This is particularly true where the characters vary widely with regard to font style and size. Commercial documents are normally prepared on typewriters and other business machines which vary widely as to typestyles. In order to have valid recognition for identification of the same characters which are of different typestyles, the references used for cross correlation are designed both generally and specifically as to different type fonts, i.e., small and large fonts and serif and sans serif fonts. References are also specifically designed for upper and lower case alphabetic characters and for numeric characters only.

Generally speaking, for character recognition, the references are classified into two major groups or areas. These are numeric and alphabetic areas. Of course, if necessary, other broad classes could be included. The two areas of references are subdivided into fields of references according to the specific types of references. Thus it is possible to choose the references for cross correlation based upon logical decisions made with regard to data learned or known about the unknown data set. For example, it may be known in advance that any alphabetic character on the document will be upper case only, lower case only or mixed upper and lower case. Further, it will be learned through field identification whether alphabetic or numeric or mixed alphabetic and numeric characters are being scanned. Hence, through the facility of logic circuitry, it is possible to select reference areas and fields. This ability to select the references eliminates cross correlating references which might add confusion and which slow down the recognition process. Thus the speed of recognition as well as the reliability of recognition is improved. Further, since it is possible to select several fields of references without terminating the cross correlation operation, the necessity for re-scanning the unknown character is minimized.

Accordingly, a principal object of the invention is to provide apparatus for selecting references for cross correlation with an unknown data set to facilitate identification thereof.

Another very important object of the invention is to provide reference selection apparatus which selects references for cross correlation with an unknown data set from references stored according to major classes and sub-classes therewithin.

Still another very important object of the invention is to provide reference selection apparatus which selects references for cross correlation with an unknown set of data on the basis of the type or class of unknown data.

Yet another very important object of the invention is to provide reference selection apparatus to improve the speed of coming to a valid identification when cross correlating an unknown set of data with the selected references.

A further very important object of the invention is to provide reference selection apparatus which selects references for cross correlation with an unknown set of data to improve the reliability of the identity of the unknown data set.

A more specific object of the invention is to provide reference selection apparatus for selecting references to be cross correlated with unknown data sets derived by scanning characters on documents processed in a multifont character recognition machine, for the purpose of identifying the characters in terms of machine processable data.

Another more specific object of the invention is to provide reference selection apparatus which selects references for cross correlation with unknown sets of data from references stored in alphabetic and numeric areas of data storage with each area being subdivided into fields arranged according to font size and style including upper and lower cases.

Still another more specific object of the invention is to provide reference selection apparatus for selecting references for cross correlation with an unknown set of data which utilizes addressable data control words having a first byte containing general control parameters for use in the cross correlation operation and a plurality of second bytes containing specific parameters with regard to the selection of the references, such as where the first reference to be correlated is located and what reference should be considered as the last reference, the second bytes being selected on a logical basis with regard to the types of unknown data sets.

The foregoing and other objects, features and advantages of the invention will be apparent from the following more particular description of a preferred embodiment of the invention as illustrated in the accompanying drawings.

In the drawings:

FIG. 1 is a block diagram illustrating the invention as incorporated into a multi-font character recognition machine;

FIG. 2 consisting of FIGS. 2a, 2b, 2c, 2d, etc. as arranged in FIG. 3 constitutes a logic circuit diagram of the invention illustrated in block form in FIG. 1;

FIG. 3 shows the arrangement for FIGS. 2a, 2b, 2c, 2d, etc.;

FIG. 4 is a diagram of a typical control word;

FIG. 5 is a diagram of a typical reference word; and

FIG. 6 is a diagram of a decision word.

GENERAL

Figure 2E:
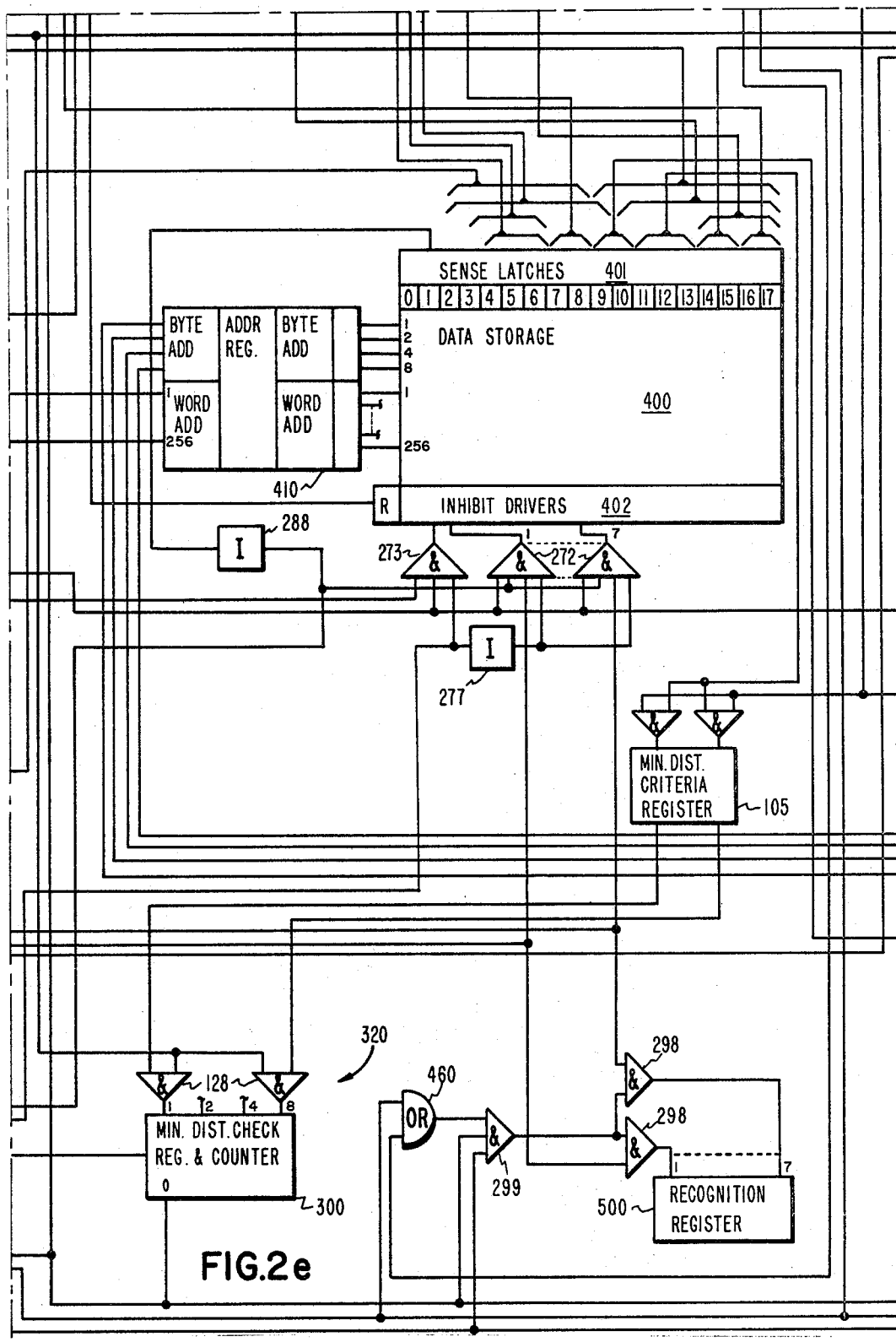

In FIG. 1, the invention is shown by way of example as being incorporated into a multifont character recognition machine of the type shown and described in a copending patent application Ser. No. 450,647, filed Apr. 26, 1965 by J. F. Bene et al., for Cross Correlation and Decision Making Apparatus. Of course, it is intended not to limit the invention to this particular use because the invention is broadly useful wherever references or tables are interrogated for the purpose of identifying or making a logical decision with respect to the unknown set of data.

In FIG. 1, characters on document 15 are scanned by means of the beam of a conventional cathode ray tube. The document 15 is stationary while being read. The movement of the beam of the cathode ray tube 10 is controlled by scanner control apparatus 20. Wherever possible like apparatus to that of the referenced Bene et al. application will be identified with like reference characters. The use of a cathode ray tube or flying spot scanner in character recognition machines is quite well known and therefore will not be particularly elaborated upon. Briefly, the characters on document 15 are scanned by moving the beam in a series of horizontally displaced vertically adjacent scans. In this example, the characters are scanned with approximately twenty vertical scans starting at the right-hand side and proceeding to the left from the bottom to the top of a character. After one vertical scan of a character, the beam flies back angularly downward to the left as it is deflected both horizontally and vertically and then makes another vertical scan from the bottom to the top. This action repeats until the character is completely scanned by approximately twenty vertical scans.

As the characters are scanned, the cathode ray tube beam is reflected from document 15 to photomultiplier tube 25. The amount of light reflected from a character is generally substantially less than the reflected light from the background area of the document. Photomultiplier tube 25 is activated by the reflected light and develops a signal at one level due to the light reflected by a character and a signal at another level from the light reflected by the document background area. These signals are both analog in amplitude and time and are termed the video signal. The video signal is then amplified and digitized in both amplitude and time by circuitry 30 which includes video amplifying, contrast, clipping and digitizing circuits all of the type well known in the art. In this particular example, the analog video signal developed as a result of each vertical scan is digitized into thirty-two increments. The amount of time for flyback equals seven increments.

The amplitude of the signal at each of the thirty-two increments will be at one of two levels depending upon the optical condition at the particular time of scanning. If a certain amount of a portion of a character is engaged by the beam during one of the thirty-two increments of the vertical scan, then the optical condition is said to be black and the signal amplitude will be at a one level. If none or only a very small part of a portion of a character is engaged, the optical condition is considered white and the signal amplitude will be at a zero level. The clipping and contrast circuit 30 determines if the optical condition for a particular segment is black or white. The segments of a vertical scan and flyback are determined by control circuit 35 which provides the proper timing signals.

It is thus seen that the shape of the unknown character is transformed into a set of digital signals. As pointed out in the referenced Bene et al. application, these digital signals could form the unknown data set which will be cross correlated with references. However, these digital signals are first stored and then examined by measurement logic to result in a reduction of the digitized video data.

Figure 2F:
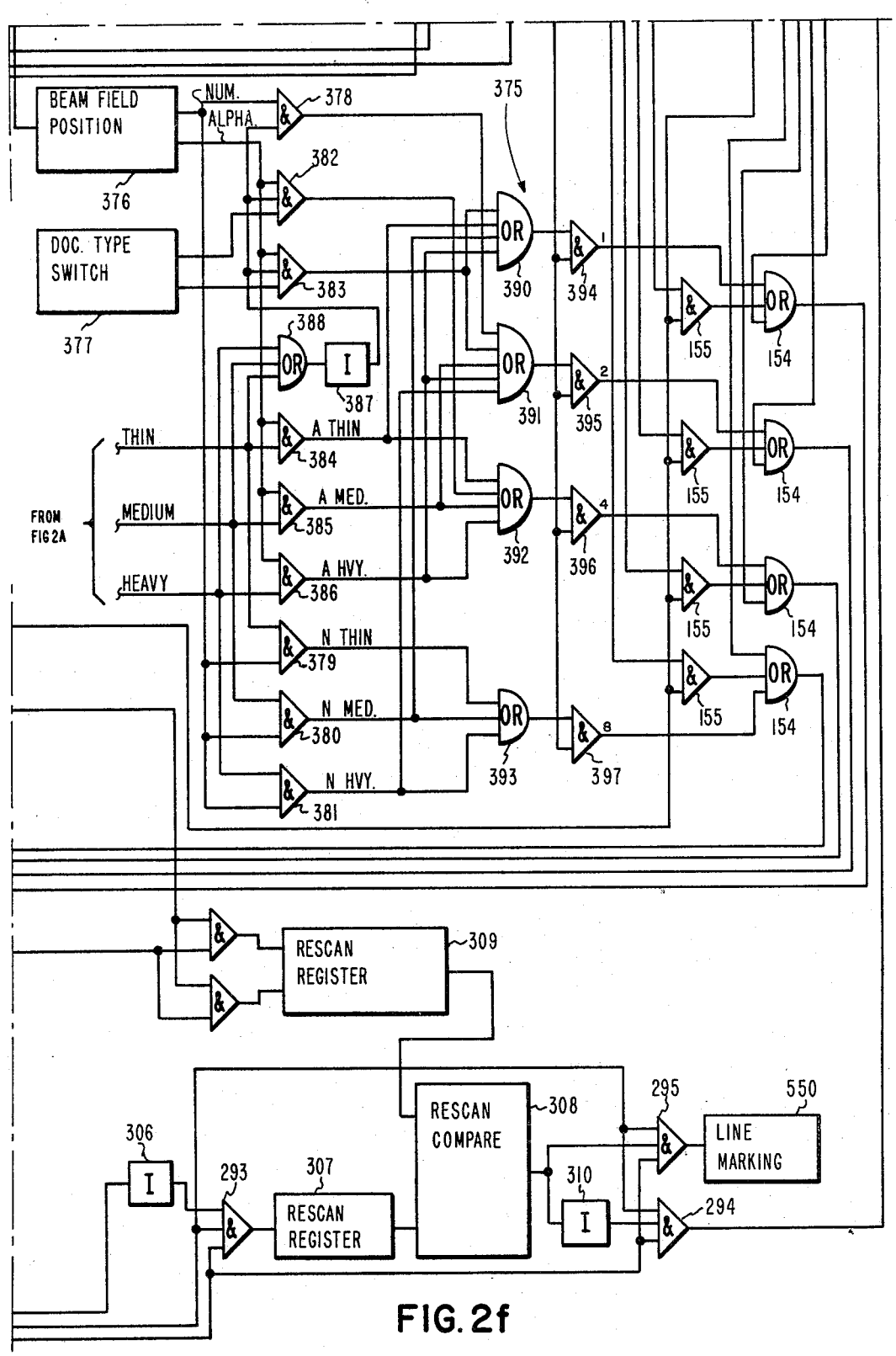

The measurements which are in digital form then represent the unknown character. The shift register 40, measurements 50 and measurement register 55 of FIG. 2 are represented by block 60 in FIG. 1.

Upon completion of the scanning of a character, the conditions of the measurements representing the character or unknown data set are cross correlated with known data sets or references taken from data storage 400. Cross correlation takes place while another character is being scanned and measurements are being made upon the resultant digitized video data.

The cross correlation process thus begins at the end of scanning a first character. An end-of-character or segmentation circuit 45, which counts the number of scans for scanning a character in response to signals from control 35, generates a signal after a character has been completely scanned. This signal resets the branch address register 80, gates the measurements 50 into the measurement register 55, FIG. 2, after having reset the same, and causes the decision word to be scanned in a destructive readout mode for the purpose of clearing it out. This is accomplished through the scan decision word logic 289, FIG. 1, which provides gating signals for transferring the decision word address into the address register 410. The access control word circuitry 350 which also receives the end-of-character signal from circuitry 45 provides an inhibit write signal for preventing the re-writing of data read out of the decision word into storage 400.

Upon completion of scanning out the decision word, the control word in storage 400 is addressed through the facility of the access control word circuitry 350. The access control word circuitry 350 develops a Correlation Ready signal. This signal is applied to reset the next address register 106. The reset condition of the next address register 106 is transferred to the word address portion of address register 410. In this particular example, the control word is addressed whenever the word address portion of the address register becomes reset. Of course, other addresses can be given to the control word and this is just an expedient way of addressing the control word. The selection ring 150 is permitted to run in response to a signal generated within the access control word circuitry 350. Thus with the control word addressed the bytes thereof become addressed as the selection ring 150 operates.

The first byte of the control word contains general parameters consisting of data bits representing the minimum distance tolerance, the minimum distance criteria, the number of rescans permitted, the field recognition threshold and the correlation cutoff mode control. These data bits are transferred to appropriate registers for storage so as to be available during the correlation process.

The second byte of the control word is addressed at selection ring 2 time and it is selected by means of encoding circuitry 375. This circuitry, as it will be seen in detail later herein, receives input information from the beam field position circuit 376 which indicates whether numeric or alphabetic characters are being scanned, from the document type switches 377 which indicate whether the characters are upper or upper and lower case and from the circuit 30 which indicates whether the characters scanned are thin, medium or heavy characters. This information is encoded into a four bit binary byte address for designating any of the remaining bytes 2 through 16 as the second byte of the control word. The information in the selected second byte of the control word includes the address for the first reference to be used in the cross correlation process, the correlation cutoff value and the program bits for indicating the end-of-field and area conditions.

The access control word circuitry 350 develops a signal for resetting the selection ring 150 after the data in the selected second byte of the control word has been transferred from storage to appropriate registers. However, the selection ring 150 after being reset, continues to operate and the address of the first reference to be used in the cross correlation process is transferred from the next address register 106 to the address register 410 during selection ring 1 time. Additionally, the code identifying the particular reference word addressed is transferred to the code register 130 and the additive constant for normalizing the particular reference with regard to mismatches is transferred to the additive constant register 136.

During selection ring 2 time, the address for the next reference word is loaded into the next address register 106 and the end-of-field and area bits are compared with the end-of-field and area program bits by compare circuitry 425 to determine whether the reference word is the last reference of a field or area and should be considered as a last reference. Any indication that the reference word is a last reference as a result of this comparison is stored in a register for use in accessing the decision word after the particular reference has been cross correlated with the unknown data set or measurements.

During selection ring 3 time, a branch address is transferred to branch address register 80 if there is not an end-of-area program bit and there is an end-of-field program bit in the selected second byte of the control word and the addressed reference contains not an end-of-area bit but an end-of-field bit. Thereafter, during selection ring 4 to 15 times, cross correlation takes place in a manner substantially similar to that described in the referenced Bene et al. application except in that application cross correlation always takes place in the converging correlation cutoff mode.

Any time a reference upon being cross correlated with the measurements 50 results in a number of mismatches less than a particular threshold value, the code of the reference in the code register 130 is written into the decision word at the byte position corresponding to the number of mismatches. The decision word address in register 102 in this instance is transferred to the address register 410 under control of a signal from the address decision word circuit 315. Further, if the reference cross correlated happened to be a last reference, then upon completion of cross correlation of this reference with the measurements, the decision word would again be addressed, but this time under control of a signal from the scanned decision word logic 289. The decision word is then scanned from the low order to the high order byte position thereof as the selection ring 150 advances through its positions. The first encountered code in the decision word is entered into the code register 130. Scanning of the decision word continues in order to facilitate the minimum distance criteria check. A second encountered code must be separated from the first encountered code within the decision word by a number of byte positions equal to the minimum distance criteria. This check is accomplished by means of the valid recognition determining circuit 320. Further, and more important to this invention is the requirement that the first code encountered in the decision word must be within the number of byte positions designated by the field recognition threshold or the best candidate will not be considered as validly identifying the unknown data set. This determination is made by means of circuitry 450 which compares the field recognition threshold with the positions of the byte selection ring 150 and if the best candidate is encountered at a position as determined by the selection ring 150 which is less than the field recognition threshold a valid recognition will have been made, of course, only if the minimum distance distance criteria has also been met. If the selection ring 150 is at a position equal to the field recognition threshold before the best candidate has been encountered and the minimum distance criteria has been satisfied, then the selection ring 150 is reset and the cross correlation process continues with a new field of references as determined by the next address which had been transferred from the reference just correlated to the next address register 106 or by the address transferred from said reference to the branch address register 80. The choice of using the address in the branch address register rather than the address in the next address register 106 is dependent upon certain physical parameters, such as the raster height at which the unknown character was scanned. For example, if the characters within the raster are not optimum with respect to line width and a valid recognition has not been made within the field recognition threshold, when the program bits designate end-of-field and area conditions, but the reference being correlated indicates only an end-of-field condition, then the branch address will be gated into the address register 410. Otherwise, cross correlation continues with the reference at the address contained within the next address register 106 which instead of the branch address is transferred to the address register 410. Cross correlation then continues until another last reference has been cross correlated. The last reference thus encountered could be the last reference of an area or an unconditional last reference of a field or a conditional last reference of a field. In any event, the decision word would again be scanned. If a valid identification of the unknown character or data set has been made, cross correlation terminates. Further, if the last reference cross correlated is an absolute terminal condition and if none of the candidates within the decision word qualify to identify the unknown character or data set, then either rescanning takes place with a clipping threshold determined by the value in the clipping threshold register 47, or the character is rejected as being unidentifiable. Rescanning takes place only if the value in the rescan register 309 permits such action. However, if the last reference cross correlated is only a conditional last reference and if none of the candidates within the decision word qualify for identifying the unknown character or data set, then cross correlation continues in the manner just described.

The foregoing provides a general understanding of the invention. In particular, it describes how the reference words are selected through the facility of the control word and how a last reference condition is determined whereby the decision word is scanned for the purpose of determining whether or not a candidate within the decision word has validly identified the unknown character or data set. Further, it is seen that in some instances, a last reference is only a conditional last reference whereas in other instances, it is an absolute terminal condition.

A detailed description of the invention will now be given. However, as previously indicated, reference will be made to the above-mentioned Bene et al. application at appropriate times so as to permit bringing this invention into stronger focus.

DETAILED DESCRIPTION

End-of-Character Circuitry

The end-of-character circuitry 45 functions to provide an indication when a character has been completely scanned. This indication is in the form of an electrical signal which essentially start the cross correlation process. The details of the end-of-character circuitry 45 are not shown because it can be simply a counter which counts the number of vertical scans required to scan a character. These signals for each vertical scan come from control 35. Of course, the end-of-character circuitry 45 would have to be substantially more elaborate under certain conditions, particularly where on control has been exercised over the preparation of the documents bearing the characters to be scanned. In other words, while characters may be of a fixed pitch, there are instances where the spacing between characters is not uniform. In some instances, the characters actually touch each other or overlap one another. Therefore, it is recognized that there are requirements for having a more sophisticated end-of-character circuit. However, for the purpose of describing the present invention, it is unnecessary to have anything more than a simple counter which emits a signal after a predetermined number of scans have been counted.

The signal generated by the end-of-character circuitry 45 is applied to reset the measurement register 55 and to gate the measurements 50 therein. This signal is also delayed by delay 38 for resetting the measurements 50. Delay 39 insures that Measurement Register 55 is reset before measurements 50 are gated forward. The signal from end-of-character circuitry 45 is also applied to reset the branch address register 80 and to condition logical AND circuits 109 via logical OR circuits 110 to facilitate the transfer of the decision word address in register 102 to the word address portion of address register 410 via the logical OR circuits 111. This enables addressing the decision word to permit the same to be cleared out prior to cross correlation of the first reference. The bytes within the decision word are addressed as the byte selection ring 150 advances through its positions 1 through 16. The byte selection ring is started by means of the signal from the end-of-character circuitry 45 which is applied to condition logical AND circuit 157 via logical OR circuit 353. Further, the inhibit write signal is developed through the facility of the signal from the end-of-character circuitry 45 which is applied to logical AND circuit 352 the same being conditioned at this time by the reset output of control word latch 361. The output of logical AND circuit 352 is applied to an input of logical OR circuit 356, the same having its output connected to the set input of inhibit write latch 357. The set output of the latch 357 is connected to hold the inhibit drivers 402 reset and is also connected to an input of logical AND circuit 359 which also has an input connected to the output of position 16 of the byte selection ring 150. Thus, after the decision word has been cleared, this being completed at selection ring 16 time, logical AND circuit 359 passes a correlation ready signal which rests the next address register 106 via a logical OR circuit 363, resets a latch 355 and sets the control word latch 361. It should also be noted that the signal from the end-of-character circuitry 45 sets the decision word latch 291 via logical OR circuit 312. However, this latch becomes reset by the correlation ready signal passed by logical AND circuit 359 via logical OR circuit 364.

With the control word latch 361 set, and the next address register 106 reset, the control word can be accessed. Thus, from the immediate foregoing description, it is seen that the end-of-character circuit 45 provides a signal after a character has been completely scanned to facilitate clearing out the decision word and set up conditions for accessing the control word.

Accessing the control word

In this particular example, the control word is addressed whenever the word address portion of the address register 410 becomes reset. When the control word latch 361 was set, the input conditions to logical AND circuit 354 were satisfied and latch 355 becomes set. The set output of latch 355 is used to condition logical AND circuit 157, via logical OR circuit 353 whereby the selection ring 150 remains conditioned for operation during the entire cross correlation process. Further, when logical AND circuit 359 passed a correlation ready signal, the next address register 106 became reset via logical OR circuit 363. This reset condition is passed to the word address portion of the address register 410 as the logical AND circuits 129 become conditioned by a signal from the control word latch 361 via logical OR circuits 366. Thus, the logical AND circuits 129 pass the reset condition to the word address portion of the address register 410, at selection ring 1 time and the first byte of the control word is addressed.

The minimum distance tolerance bits, the clipping threshold bits, the rescan bits, the minimum distance criteria bits, the correlation cutoff mode bit and the field recognition threshold bits are transferred to the minimum distance tolerance register 104, the clipping threshold register 47, the rescan register 309, the minimum distance criteria register 105, the correlation cutoff mode register 115, and the field recognition threshold register 445 respectively. It should be noted that all of these registers are loaded under control of a signal passed by logical AND circuit 135 which has inputs connected to the set output of the control word latch 361 and to position 1 of the byte selection ring 150.

The selection of the second byte of the control word takes place at selection ring 2 time under control of logical AND circuit 360 which is conditioned by the set output of control word latch 361. The actual selection of the second byte of the control word is accomplished by means of the encode second byte control word circuitry 375. This circuitry will be described shortly. After the second byte of the control word has been selected and the information therein has been transferred to the appropriate registers, the byte selection ring 150 is reset by a signal from logical AND circuit 362 which is conditioned by the set output of the control word latch 361, position 2 of the selection ring 150 and the set output of latch 355.

It is thus seen that the access control word circuitry 350 functions to control the addressing of the control word for both the first and second bytes thereof and thereafter resets the byte selection ring 150 to permit the correlation process to continue with the first reference at the address designated in byte 2 of the control word. While the accessing of the second byte of the control word is under control of the circuitry 350, the actual selection of the second byte is accomplished by the encode second byte control word circuitry 375.

Encode second byte control word

The encode second byte control word circuitry 375 develops a four bit binary byte address which selects the second byte of the control word. Since the first byte of the control word always contains the general parameters to be used for the cross correlation process, the byte address for the second byte in this example can be any number 2 through 16 inclusive.

Documents normally contain information according to fields. This is particularly true with respect to business documents. For example, account numbers could constitute one field while names associated with the particular account numbers constitute another field and dollar amounts constitute still another field. The account number field will always contain numeric information, while the name field will contain only alphabetic information and the dollar amount field will contain only numeric information. Each field can be separated, such as by as heavy black line and upon sensing the heavy black line, an indication is provided that one field has terminated and a new field is to begin. Thus it is possible to determine the type of information scanned. This is the function of the beam field position circuit 376 which provides indications as to whether a numeric or alphabetic field is being scanned. It receives its inforamtion from scanner control 20.

The signal for indicating that a numeric field is being scanned is applied to logical AND circuits 378, 379, 380 and 381 respectively. Logical AND circuit 378 passes a signal whenever a numeric field is being scanned and no other information is known about the characters within the numerical field. However, logical AND circuits 379, 380 and 381 pass signals when characters within a numeric field are being scanned and the characters, as determined by the video amplifying contrasting, clipping and digitizing circuitry 30, are thin, medium or heavy, respectively. Further, in order that only one byte address be selected for the second byte of the control word, it is necessary so far as this particular logic design is concerned to develop a signal for gating the numeric only indication through logical AND circuit 378. This is accomplished by means of logical OR circuit 388 which has inputs from circuit 30 indicating thin, medium or heavy characters. The output of logical OR circuit 388 is connected to an input of inverter 387 the same having its output connected to inputs of logical AND circuits 378, 382 and 383. Logical AND circuits 382 and 383 are only conditioned when an alphabetic field is being scanned.

The logical AND circuits 382 and 383 function to pass a signal depending upon whether the document type switch 377 is set to indicate that upper case or upper and lower case alphabetic characters are being scanned. If it is known that all alphabetic characters on the document are upper case, and the document type switch 377 is set to the upper case position, then logical AND circuit 382 will pass a signal when an alphabetic field is scanned. On the other hand, if it is known that the alphabetic fields will contain both upper and lower case characters, the document type switch is set to the upper and lower case position whereby logical AND circuit 383 is conditioned to pass a signal when an alphabetic field is scanned. Logical AND circuits 384, 385, 386 pass signals when alphabetic characters are being scanned and are considered either thin, medium or heavy, respectively.

Logical OR circuits 390, 391, 392 and 393 encode the information passed by logical AND circuits 378 through 386 to provide a four bit binary byte address. For example, when logical AND circuit 378 passes a signal to logical OR circuit 391, a binary address 0010 is generated. However, when logical AND circuit 383 passes a signal, it is applied to logical OR circuits 390 and 391 and the binary address 0011 is generated. The binary address 0010 selects byte 2 as the second byte of the control word and the address 0011 selects byte 3 as the second byte of the control word.

The outputs of logical OR circuits 390, 391, 392 and 393 are connected to inputs of logical AND circuits 394, 395, 396 and 397 respectively, which are conditioned by the output of logical AND circuit 360. The outputs of logical AND circuits 394, 395, 396 and 397 are connected to inputs of logical OR circuits 154, which function to pass the binary byte address into the byte address portion of the address register 410.

The information in the selected second byte of the control word is transferred at selection ring 2 time. This information includes the address of the first reference to be cross correlated. The address of this first reference is transferred into the next address register 106 under control of the logical AND circuits 107 which are conditioned at selection ring 2 time and by the set output of the control word latch 361. The program bits X1 and X2 indicating the end-of-area and end-of-field conditions, respectively, are also contained in the second byte of the control word and are entered into a register 424. The correlation cutoff value to be used in the cross correlation process is entered into the correlation cutoff register 113 via the logical AND circuit 114. It should be noted that the correlation cutoff register 113 contains the correlation value to be used initially for all modes of cross correlation, i.e., for both fixed and converging correlation cutoff modes.

With the second byte of the control word having been selected through the facility of the encode second byte control word circuitry 375 and the information in the selected second byte having been transferred to the appropriate registers, a cross correlation process with the first reference is ready to begin. In this particular example, cross correlation can take place in either a fixed or converging correlation cutoff mode whereas in the referenced Bene et al. application, cross correlation always takes place in the converging correlation cutoff mode.

*Cross correlation*

The cross correlation of the measurements 50 in register 55 with the references in storage 400 takes place in substantially the same manner as described in the referenced Bene et al. application. The address of the first reference to be cross correlated is in the next address register 106. This address is entered into the word address portion of the address register 410 via logical AND circuits 129 which are conditioned at this time by a signal passed by logical OR circuits 366. The other input conditions to the logical AND circuits 129 are satisfied at this time because the last reference latch 141 is in its reset condition and the selection ring 150 is enabled to be advanced.

Logical OR circuits 366 have inputs connected to the set output of the control word latch 361 and to the reset output of the last reference latch 141. Hence, at selection ring 1 time, byte one of the selected reference word is addressed and the code thereof is transferred to the code register 130 and the additive constant for normalizing the number of mismatches with respect to this reference word is transferred to the additive constant register 136. At selection ring 2 time the address for the next reference to be used in the cross correlation process is transferred to the next address register 106 and the end-of-area and end-of-field indicating bits X1 and X2 respectively, for that reference are applied to compare circuitry 425. The compare circuitry 425 shown in block form only determines if the end-of-area and field bits within the reference word match the end-of-area and field conditions as represented by the progam bits in register 484.

For this particular example, four different conditions are possible. The program bits X1 and X2 can designate that a reference in order to be considered a last reference must contain an end-of-area bit only, both end-of-area and end-of-field bits and an end-of-field bit only. While only three conditions have just been stated, a fourth condition is developed when there are program bits designating both an end-of-area and field conditions and the reference under consideration only has an end-of-field bit. This fourth condition signifies that the last reference is only a conditional last reference and if a valid identification of the unknown character or data set cannot be made, the cross correlation process should continue with another set of references. The results of the comparison, however, are not used until after the reference has been cross correlated and, therefore, they are stored in a register 426.

The branch address within the reference word is available during slection ring 3 time and is entered into the branch address register 80 if the above mentioned fourth condition exists. Logical AND circuits 81 control the transfer of the branch address from byte 3 of the reference word into the branch address register 80 while logical AND circuits 82 control the transfer of the branch address into the word address portion of the address register 410. Logical AND circuits 82 are conditioned by an output from logical AND circuit 83 which is conditioned by the fourth end-of-area, end-of-field condition when a valid identification could not be made where the scanned character is not optimized with regard to line width.

During byte 4 through byte 15 times, the Ideal and Defining reference bits are cross correlated with the measurements 50 in register 55 by the correlation and decode circuitry 160, as described in the referenced Bene et al. application. If operating in the converging correlation cutoff mode, as determined by the presence of a bit in register 115, the minimum distance tolerance value is entered into the mismatch summer 120 and the correlation cutoff value in register 113 is updated in the manner described in the Bene et al. application. When operating in the fixed correlation cutoff mode, i.e., the absence of a bit in register 115, the minimum distance tolerance value is not entered into the mismatch summer 120. Further, the value entered into the correlation cutoff register 113 remains unchanged during the entire cross correlation operation and all references which result in a number of mismatches equal to or less than the correlation cutoff value become candidates for identifying the unknown character or data set.

It should be noted that the code of a reference qualifying to identify the unknown character or data set is entered into the decision word in the same manner for both fixed and converging correlation cutoff modes. When the correlation compare circuitry 250 develops an accept candidate signal, the decision word address latch 317 is set via a signal passed by logical AND circuit 316 which is conditioned at selection ring 16 time. The set output of the latch 317 conditions logical AND circuits 155 which pass the value in the mismatch summer 120 into the byte address portion of the address register 410 via the logical OR circuits 154. The latch 317 is reset by a signal from delay 318 which receives a signal from position 16 of the selection ring 150. The reset output of latch 317 is connected to an input of logical AND circuit 320 which also has an input from the output of inverter 319. Inverter 319 has its input connected to the output of logical AND circuit 360 of the access control word circuitry 350. The output of logical AND circuit 320 is connected to condition logical AND circuits 152 so as to facilitate addressing by means of the selection ring 150 when not addressing the second byte of the control word.

Cross correlation continues with the reference specified by the address in the next address register 106, provided the reference just correlated was not a last reference. If the reference just correlated is a last reference as determined by the compare circuitry 425, one of the inputs to logical OR circuit 427 will be satisfied and thus the last reference latch 141 will be set. With the last reference latch 141 set, logical AND circuits 112, 290 and 292 are conditioned. Further at selection ring 1 time, the decision word address in register 102 is transferred to the word address portion of address register 410 and the decision word latch 291 is set via logical OR circuit 312. The decision word latch 291 provides a further conditioning input to logical AND circuit 292 which will pass a signal for setting the first code latch 296 when a first code is encountered while scanning the decision word at this time. The process for determining whether or not this code represents a reference which has validly identified the unknown character or data set is the same as that described in the reference Bene et al. application. However, in addition to the requirements set forth for a valid code in the Bene et al. application, the field recognition threshold must be satisfied when the fourth end-of-area, end-of-field condition exists.

The field recognition threshold is represented by two bits which are encoded by encode circuit 446, to indicate a value of 4, 6 or 8. The encoding circuitry 446 is merely logic circuitry for combining bipolar bit representations within register 445 and providing three possible outputs which are arbitrarily designated as 4, 6 or 8. The output lines from the encode circuitry 446 representing 4, 6 and 8, are compared with the 4, 6 and 8 output positions of selection ring 150 by means of compare circuitry 447. If a candidate is encountered within the decision word and the minimum distance criteria has been satisfied at a level within the decision word which is less than the field recognition threshold, the input conditions to logical AND circuit 449 will be satisfied and the code of the best candidate will be considered as the identity of the unknown character or data set. The output of the logical AND circuit 449 is connected to an input of the logical OR circuit 460 which has its output connected to condition logical AND circuit 299. The output of logical AND circuit 299 conditions the logical AND circuits 298 for passing the code in register 130 into the recognition register 500. The output of logical AND circuit 449 is also connected to an input of logical OR circuit 452 which has its output connected to the input of logical OR circuit 454. The output of OR circuit 454 is connected to the reset terminal of the last reference latch 141.

On the other hand, if a candidate within the decision is not encountered by the time that the active position of the positions 4, 6 or 8 of the selection ring 150 equals the encoded value of the recognition threshold, then a valid decision cannot be made and the input conditions to logical AND circuit 448 are satisfied whereby a decision reset signal is generated. The decision reset signal is passed by logical OR circuit 364 to reset the decision word latch 291 and to reset the byte selection ring 150 via the logical OR circuit 158. The output of logical AND circuit 448 is also connected to an input of logical OR circuit 452 whereby the last reference latch 141 is reset. When this latter condition occurs, cross correlation continues and the next reference to be cross correlated will be either the one specified by the address in the next address register 106 or by the address in the branch address register 80 depending upon whether the input conditions to logical AND circuit 83 are satisfied.

The details concerning the rescanning operation are contained in the referenced Bene et al. application; however, it should be noted that in this instance, the rescan register 309 is loaded with data from the first byte of the control word and rescanning takes place with a clipping level determined by the data in the clipping threshold register 47 which contains data from the first byte of the control word.

Since the details of the access decision word circuitry 315, the compare circuits 425 and 450 were described, further description thereof is not necessary. It should also be recognized that the valid recognition determining circuitry 320 includes that circuitry described in detail in the reference Bene et al. application which is used for determining whether or not the minimum distance criteria has been met. This circuitry as pointed out above also receives an input via logical OR circuit 460 from the field recognition threshold circuitry 450.

SUMMARY

From the foregoing, it is seen that the invention provides apparatus for selecting references to be used for cross correlation with an unknown character or data set. Further, it is seen that the references to be used in the cross correlation process are first selected on a logical basis whereby the references selected are the best ones for the first attempt of cross correlation. Thereafter, if it turns out that a valid identification cannot be made, then either the character is rescanned to improve the unknown data set or a second set of references is selected to continue the cross correlation with the unknown character or data set. Thus it is seen that sets of references are selected so as to come to a decision with regard to the unknown character or data set in the shortest possible time and to reduce the rescan requirements by permitting the cross correlation process to continue with a new set of references if certain conditions exist. Further, it is seen that the field recognition threshold requires that the identification of the unknown character or data set be within a certain level of the decision word in order for the reference to validly identify the unknown character or data set. It is also seen that a branch address facilitates the selection of references according to a new sequence of fields of references within the same or different reference area.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for selecting data references for cross correlation with an unknown data set comprising:
    an addressable data storage containing a plurality of data reference words wherein each reference word contains an address of another reference word and at least one control word having a plurality of start addresses for locating first reference words to be addressed;
    addressing means for addressing words within said data storage;
    indicating means for providing a plurality of indications of types of unknown data sets;
    encoding means connected to said indicating means for encoding said indications into an address for selecting one of said start addresses within said control word; and
    means for transferring said one start address developed by said encoding means to said addressing means.

2. The reference selection apparatus of claim 1 wherein said data reference words are arranged according to areas and fields within said areas and said control word contains program bits for indicating end-of-field and end-of-area conditions and each of said references have provision for containing end-of-field and end-of-area bits and further comprising:
    means for generating a last reference signal when the end-of-field and end-of-area reference bits within a reference match the program bits within the control word.

3. The reference selecting apparatus of claim 2 wherein the control word includes program bits to define a conditional last reference condition.

4. The reference selection apparatus of claim 2 wherein said control word includes program bits to define an absolute last reference condition.

5. Apparatus for selecting data references for cross correlation with an unknown data set comprising:
    an addressable data storage containing a plurality of data reference words wherein each reference word contains an address of another reference word and at least one control word having a plurality of start addresses for locating starting reference words;
    addressing means for addressing words within said data storage;
    control means for accessing the control word, said control means being connected to transfer the address of the control word to said addressing means;
    logic means operative at the time said control word is accessed for providing said address register with data for selecting one of said start addresses within said control word to facilitate addressing a first reference word; and
    means for transferring said start address and addresses within said reference words to said addressing means to enable addressing a first reference word and thereafter addressing reference words according to the address contained in the reference words previously addressed.

6. The reference selection apparatus of claim 5 further comprising:
    means for determining a last reference word condition.

7. The reference selection apparatus of claim 2 further comprising:
    means responsive to said last reference signal for determining if said unknown data set has been identified by one of said addressed references.

8. The reference selection apparatus of claim 7 further comprising:
    means for continuing said cross correlation process if said unknown data set is unidentified by said addressed references.

9. The reference selection apparatus of claim 8 whereby said cross correlation process continues with the reference selected by the next reference address contained in the reference which caused the last reference signal to be generated.

References Cited

UNITED STATES PATENTS

| 2,968,027 | 1/1961 | McDonnell et al. | |
| 3,111,648 | 11/1963 | Marsh et al. | 340—172.5 |
| 3,153,775 | 10/1964 | Marsh | 340—172.5 |
| 3,246,299 | 4/1966 | Rice et al. | 340—172.5 |
| 3,297,997 | 1/1967 | Grady et al. | 340—172.5 |

PAUL J. HENON, *Primary Examiner.*